US 12,063,172 B2

(12) United States Patent
Sun et al.

(10) Patent No.: US 12,063,172 B2
(45) Date of Patent: Aug. 13, 2024

(54) DESIGNS FOR MULTI-DCI BASED MULTI-TRP OPERATION

(71) Applicant: Apple Inc., Cupertino, CA (US)

(72) Inventors: Haitong Sun, Cupertino, CA (US); Chunhai Yao, Beijing (CN); Chunxuan Ye, San Diego, CA (US); Dawei Zhang, Saratoga, CA (US); Hong He, San Jose, CA (US); Oghenekome Oteri, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 357 days.

(21) Appl. No.: 17/593,427

(22) PCT Filed: May 15, 2020

(86) PCT No.: PCT/CN2020/090503
§ 371 (c)(1),
(2) Date: Sep. 17, 2021

(87) PCT Pub. No.: WO2021/227004
PCT Pub. Date: Nov. 18, 2021

(65) Prior Publication Data
US 2022/0303080 A1  Sep. 22, 2022

(51) Int. Cl.
*H04L 5/00* (2006.01)
*H04L 1/1812* (2023.01)
*H04W 72/23* (2023.01)

(52) U.S. Cl.
CPC .......... *H04L 5/0035* (2013.01); *H04L 1/1812* (2013.01); *H04W 72/23* (2023.01)

(58) Field of Classification Search
CPC .................. H04W 72/1289; H04L 1/1812
See application file for complete search history.

(56) References Cited

U.S. PATENT DOCUMENTS

| 2019/0342035 A1 | 11/2019 | Zhang et al. |
| 2020/0145984 A1* | 5/2020 | Hosseini ............... H04W 72/51 |

(Continued)

FOREIGN PATENT DOCUMENTS

| WO | 2018/127145 | 7/2018 |
| WO | 2020/030053 | 2/2020 |

OTHER PUBLICATIONS

Apple Inc., "Views on Rel-16 eMIMO UE feature list"; 3GPP TSG RAN WG1 #100bis; R1-2002353; Apr. 30, 2020; 6 sheets.

(Continued)

*Primary Examiner* — Zhiren Qin
(74) *Attorney, Agent, or Firm* — Fay Kaplun & Marcin, LLP (57) ABSTRACT

Various user equipment (UE) operations performed when the UE is in multiple Downlink Control Information (multi-DCI) based multiple transmission and reception point (multi-TRP) configuration. The operations receiving, from one of the first or second gNBs, one or more cell reference signal (CRS) rate matching patterns, wherein the one or more CRS rate matching patterns comprise an indication of a control resource set (CORESET) pool for each of the one or more CRS rate matching patterns and applying the one or more CRS rate matching patterns to a CORESET for a Physical Downlink Shared Channel (PDSCH) based on the indication of the CORESET pool.

18 Claims, 6 Drawing Sheets

(56) References Cited

U.S. PATENT DOCUMENTS

2021/0321372 A1* 10/2021 Zhou ................. H04W 72/1268
2022/0021482 A1*  1/2022 Wang ................ H04W 72/0453
2022/0150011 A1*  5/2022 Kim ..................... H04L 5/0048
2023/0132040 A1*  4/2023 Gao ..................... H04W 72/23
                                                            370/329

OTHER PUBLICATIONS

Vivo, "Discussion on remaining issues on multi-TRP operation"; 3GPP TSG RAN WG1 #100bis; R1-2001678; Apr. 30, 2020; 17 sheets.
Qualcomm Incorporated, "Discussion the MIMO RRC parameter CRS pattern list"; 3GPP TSG-RAN WG2 Meeting #109 electronic; R2-2001036; Mar. 6, 2020; 3 sheets.
Vivo, "Discussion on eMIMO features"; 3GPP TSG RAN WG1 #99; R1-1912043; Nov. 22, 2019; 4 sheets.
Ericsson, "Offline discussion 110: eMIMO RRC CR discussion"; 3GPP TSG-RAN WG2 Meeting #109-e; R2-2001677; Mar. 11, 2020; 34 sheets.
Moderator (OPPO), "Summary of email thread [100b-e-NR-eMIMO-multiTRP-02]"; 3GPP TSG RAN WG1 #100bis; R1-2002946; Apr. 30, 2020; 24 sheets.

* cited by examiner

DESIGNS FOR MULTI-DCI BASED MULTI-TRP OPERATION

BACKGROUND INFORMATION

Multiple transmission and reception point (multi-TRP) functionality in 5G New Radio (NR) involves a UE maintaining multiple links with multiple TRPs (e.g. multiple gNBs) simultaneously on the same carrier. Multi-TRP operations may be single Downlink Control Information (DCI) based or a multi-DCI based. In single-DCI based multi-TRP operation, a Physical Downlink Shared Channel (PDSCH) on multiple carriers may be scheduled using a single DCI on a Physical Downlink Control Channel (PDCCH). In multi-DCI based multi-TRP operation, the Physical Downlink Shared Channel (PDSCH) on multiple carriers may be scheduled using a multiple DCIs on PDCCHs on multiple carriers.

SUMMARY

Some exemplary embodiments are related to a method performed by a user equipment (UE) in multiple Downlink Control Information (multi-DCI) based multiple transmission and reception point (multi-TRP) configuration having simultaneous connections with a first next generation node B (gNB) and a second gNB over a same carrier. The method includes receiving, from one of the first or second gNBs, one or more cell reference signal (CRS) rate matching patterns, wherein the one or more CRS rate matching patterns comprise an indication of a control resource set (CORESET) pool for each of the one or more CRS rate matching patterns and applying the one or more CRS rate matching patterns to a CORESET for a Physical Downlink Shared Channel (PDSCH) based on the indication of the CORESET pool.

Other exemplary embodiments are related to a user equipment (UE) having a transceiver and a processor. The transceiver is configured to connect to a first next generation node B (gNB) and a second gNB over a same carrier in a multiple Downlink Control Information (multi-DCI) based multiple transmission and reception point (multi-TRP) configuration. The processor is configured to receive, from one of the first or second gNBs, one or more cell reference signal (CRS) rate matching patterns, wherein the one or more CRS rate matching patterns comprise an indication of a control resource set (CORESET) pool for each of the one or more CRS rate matching patterns, and apply the one or more CRS rate matching patterns to a CORESET for a Physical Downlink Shared Channel (PDSCH) based on the indication of the CORESET pool.

Still further exemplary embodiments are related to n integrated circuit configured for use in a user equipment (UE) in multiple Downlink Control Information (multi-DCI) based multiple transmission and reception point (multi-TRP) configuration having simultaneous connections with a first next generation node B (gNB) and a second gNB over a same carrier. The integrated circuit includes circuitry configured to receive, from one of the first or second gNBs, one or more cell reference signal (CRS) rate matching patterns, wherein the one or more CRS rate matching patterns comprise an indication of a control resource set (CORESET) pool for each of the one or more CRS rate matching patterns and circuitry configured to apply the one or more CRS rate matching patterns to a CORESET for a Physical Downlink Shared Channel (PDSCH) based on the indication of the CORESET pool.

DETAILED DESCRIPTION

The exemplary embodiments may be further understood with reference to the following description and the related appended drawings, wherein like elements are provided with the same reference numerals. The exemplary embodiments describe various solutions for a UE in multi-DCI based multi-TRP operation.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

In addition, the exemplary embodiments are described with regard to a 5G New Radio (NR) cellular network. However, reference to a 5G NR network is merely provided for illustrative purposes. The exemplary embodiments may be utilized with any network that implements the functionalities described herein for UE capability reporting. Therefore, the 5G NR network as described herein may represent any network that includes the functionalities described herein for the 5G NR network.

Multiple transmission and reception point (multi-TRP) functionality involves a UE maintaining multiple links with multiple TRPs (e.g. multiple gNBs) concurrently on the same carrier. As described above, when operating in multi-TRP, the UE may be in single-DCI or multi-DCI mode. The exemplary embodiments are related to a UE in multi-DCI based multi-TRP operation.

The multi-DCI mode may have various characteristics. For example, each TRP may be scheduled by a control resource set (CORESET) that has a corresponding CORESETPoolIndex from {0, 1}, e.g., there are two pools of CORESETS. When the CORESETPoolIndex is not configured, it may be assumed to be 0. A maximum of 3 CORESETs per bandwidth part (BWP) may be configured for each CORESETPoolIndex and a maximum of total 5 CORESETs per BWP may be configured. Two (2) Physical Downlink Shared Channels (PDSCH) may be fully/partial/non-overlapping. In addition, the Hybrid Automatic Repeat Request-Acknowledgement (HARQ-ACK) feedback supports both a separate and a joint feedback mode with a maximum of two (2) codeword (CW) and 16 HARQ processes.

Based on these characteristics of the multi-DCI operation, there are several issues that need to be addressed for effective multi-DCI operation. These include cell reference signal (CRS) rate matching patterns design, a default R for pdcch-BlindDetectionCA capability reporting (which will be described in greater detail below), a default HARQ-ACK feedback mode, a default Transmission Configuration Indication (TCI) state for Aperiodic Channel State Indication-Reference Signals (AP-CSI-RS), a default Physical Uplink Control Channel (PUCCH) default beam and pathloss RS and a conflict of multi-DCI and single-DCI configurations. The exemplary embodiments address each of these issues.

Figure 1:
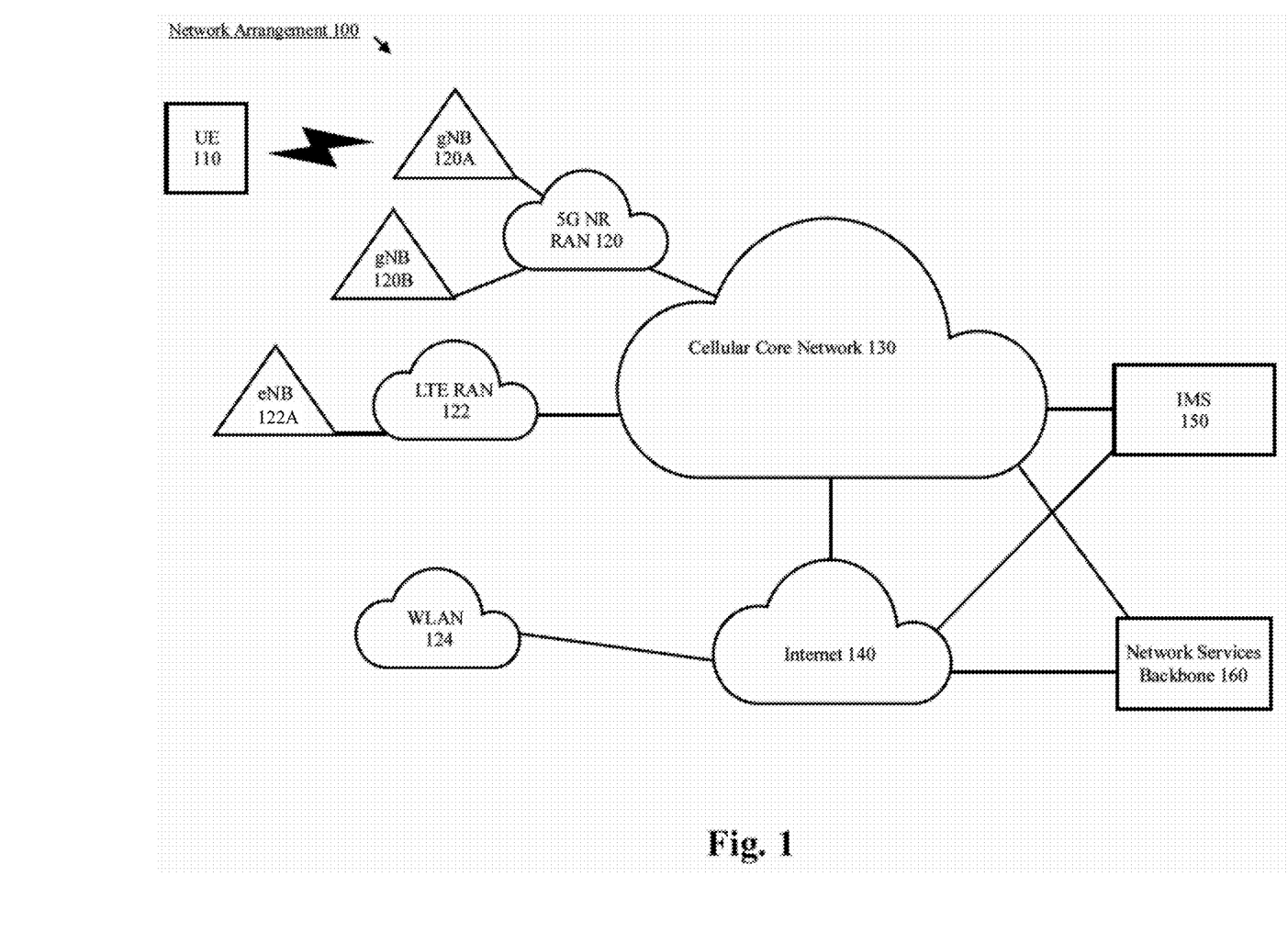
FIG. 1 shows a network arrangement according to various exemplary embodiments.

FIG. 1 shows an exemplary network arrangement 100 according to various exemplary embodiments. The exemplary network arrangement 100 includes a user equipment (UE) 110. Those skilled in the art will understand that the UE may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g. legacy cellular networks) and the UE 110 may also communicate with networks over a wired connection. With regard to the exemplary embodiments, the UE 110 may establish a connection with the 5G NR-RAN 122.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation nodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNB 120A, 120B is merely for illustrative purposes. The exemplary embodiments may apply to any appropriate number of gNBs.

Specifically, the UE 110 may simultaneously connect to and exchange data with a plurality of gNBs 120A, 120B in a multi-cell CA configuration or a multi-TRP configuration. The UE 110 may also connect to the LTE-RAN 122 via either or both of the eNBs 122A, 122B, or to any other type of RAN, as mentioned above. In the network arrangement 100, the UE 110 is shown as having a simultaneous connection to the gNBs 120A and 120B. The connections to the gNBs 120A, 120B may be, for example, multi-TRP connections where both of the gNBs 120A, 120B provide services for the UE 110 on a same channel.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
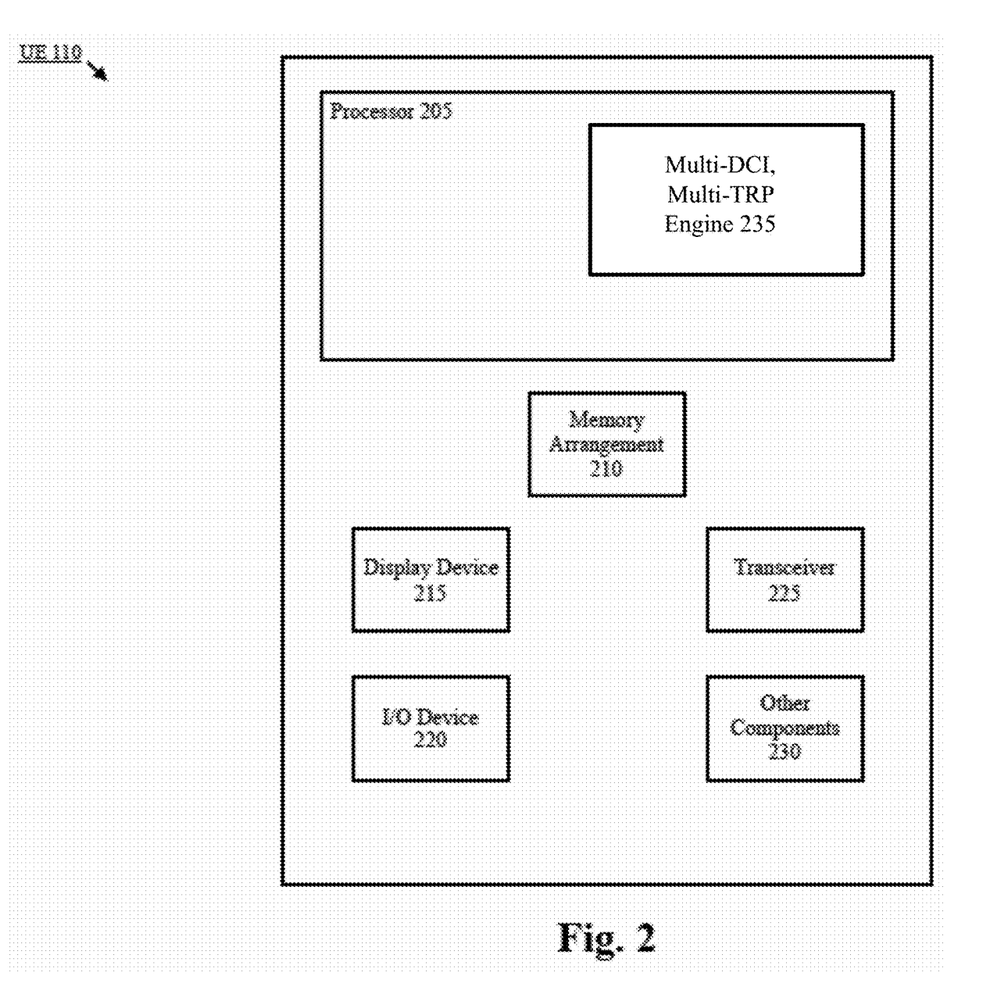
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a multi-DCI, multi-TRP engine 235. The multi-DCI, multi-TRP engine 235 may perform operations to address the issues identified above with a UE in multi-DCI based multi-TRP operation. The specific operations will be described in further detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

As described above, a first issue to be resolved for a UE in multi-DCI based multi-TRP operation includes CRS rate matching pattern design. CRS rate matching is for the NR Physical Downlink Shared Channel (PDSCH) to rate match the LTE CRS at a resource element (RE) level to allow for LTE and NR coexistence in the same channel. In the exemplary embodiments, up to (6) CRS patterns may be supported per cell. This may include up to (3) CRS patterns in the frequency domain in the same cell if it is considered that LTE supports up to a 20 MHz carrier while NR supports up to a 100 MHz carrier. This may also include up to two (2) CRS patterns per frequency range if it is considered that NR supports multi-TRP operation.

Figure 3A:
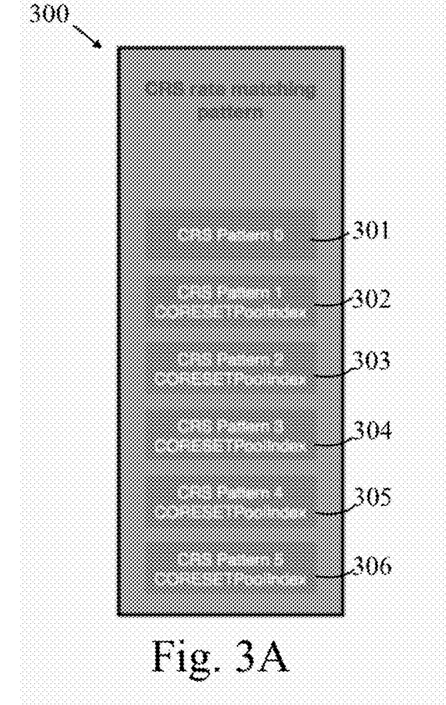
FIGS. 3A-3C show three examples of cell reference signal (CRS) rate matching patterns according to various exemplary embodiments.
Figure 3B:
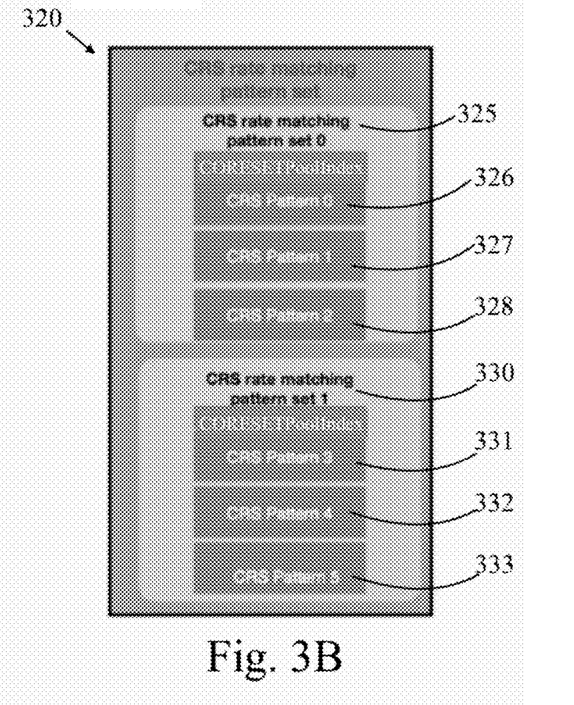
Figure 3C:
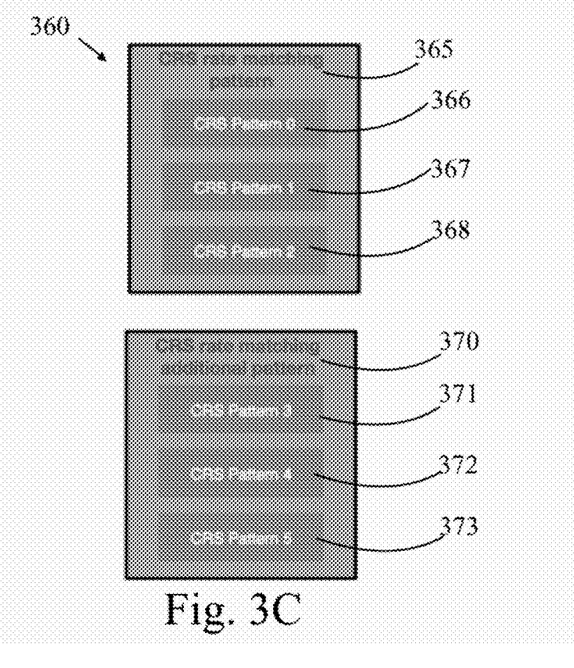

FIGS. 3A-3C show three examples of CRS rate matching patterns according to various exemplary embodiments. A design consideration for the CRS rate matching patterns, for an individual serving cell, may be that the cell indicates to which (CORESETPoolIndex) the TRP belongs.

FIG. 3A shows a first exemplary CRS rate matching pattern 300 according to various exemplary embodiments. In this example, each CRS pattern 301-306 may be configured. This may include the information for each pattern such as, including v-Shift of the LTE CRS, the number of the LTE CRS port, the LTE downlink carrier frequency, the LTE downlink carrier bandwidth, the LTE Multimedia Broadcast Single Frequency Network (MBSFN) subframe configuration and a CORSETPoolIndex.

FIG. 3B shows a second exemplary CRS rate matching pattern 320 according to various exemplary embodiments. In this example, two (2) sets 325, 330 of CRS patterns may be configured. Each CRS pattern set may include a CORSETPoolIndex, e.g., CRS pattern set 325 may have the CORSETPoolIndex{0} and CRS pattern set 330 may have the CORSETPoolIndex{1}. Each CRS pattern set 325, 330 may also include a list of CRS patterns, e.g., CRS patterns 326-329 for CRS pattern set 325 and CRS patterns 331-333 for CRS pattern set 330. Each CRS pattern may include the information as was described above with respect to FIG. 3A. However, in this example, the CORSETPoolIndex may not be included because this information is known based on the CRS pattern set 325, 330 to which the CRS pattern belongs.

FIG. 3C shows a third exemplary CRS rate matching pattern 340 according to various exemplary embodiments. In this example, a new CRS pattern list is configured which corresponds to the secondary TRP. As was described above, each cell may support (3) CRS patterns in the frequency domain. Thus, the primary cell (e.g. gNB 120A) may support the CRS pattern list 365 that includes the CRS patterns 366-368. The new CRS pattern list 370 including CRS patterns 371-373 may be configured to correspond to the secondary TRP (e.g., gNB 120B).

There may be situations where multiple CRS rate matching patterns are configured per TRP. The CORESETPoolIndex may only take on the values of 0, 1 or not configured. Moreover, as described above, each CORESETPoolIndex may have a maximum of three (3) CRS rate matching patterns configured. The CORESETPoolIndex can be either explicitly or implicitly configured. In the explicit situation, the explicit configuration will be used. In the implicit situation, e.g., the CORESETPoolIndex is not configured, the CORESETPoolIndex may be assumed to be 0. There is an exception to this assumption. When there are already three (3) CRS rate matching patterns explicitly configured with CORESETPoolIndex=0 (e.g., the maximum number of CRS rate matching patterns per CORESETPoolIndex, the CORESETPoolIndex may be assumed to be 1.

As described above, a second issue to be resolved for a UE in multi-DCI based multi-TRP operation is a default R for pdcch-BlindDetectionCA capability reporting. This refers to a UE capability with respect to blind detection and non-overlapping Control Channel Elements (CCE) in carrier aggregation (CA) operation. A DCI that is to be transmitted on the Physical Downlink Control Channel (PDCCH) to the UE 110 may be mapped to particular control channel elements (CCEs). However, a subframe may include DCI that is not relevant to the UE 110 and the UE 110 may not be aware of where the DCI intended for the UE 110 is located within the subframe. Thus, the UE 110 may be configured to the find the DCI relevant to the UE 110 within the subframe by monitoring and blindly decoding a particular set of PDCCH candidates (e.g., a set of one or more consecutive CCEs on which PDDCH for the UE 110 may be mapped).

For PDCCH decoding, the actual number of blind decodes and non-overlapped CCEs is controlled by the network in a parameter labeled as a BDFactorR or $\gamma$. The UE 110 may report its R factor together with another a parameter labeled pdcch-BlindDetectionCA that may be set to a value of $\{1,2\}$. When the UE 110 reports the pdcch-BlindDetectionCA, the UE 110 may be indicated the BDFactorR as either $\gamma=1$ or $\gamma=R$.

However, when the UE 110 does not report the pdcch-BlindDetectionCA parameter or when the UE does not report R, a default value of R is to be used. The exemplary embodiments provide various manners of determining the default value for R. In a first example, the UE 110 is required to report its R value $\{1,2\}$. Thus, there is no situation where a default value is needed because the UE 110 will always report the R value. In a second exemplary embodiment, it may be considered that the default value is $\{1\}$. In a third exemplary embodiment, it may be considered that the default value is $\{2\}$.

As described above, a third issue to be resolved for a UE in multi-DCI based multi-TRP operation is a default HARQ-ACK feedback mode. For multi-DCI based multi-TRP operation, the UE can be configured to one of two different HARQ-ACK feedback modes. A first HARQ-ACK feedback mode may be termed, "joint feedback", where the HARQ-ACK from two (2) PDSCHs are fed back in the same HARQ-ACK codebook. A second HARQ-ACK feedback mode may be termed, "separate feedback", where the HARQ-ACK from two (2) PDSCHs are fed back in separate HARQ-ACK codebooks, carried by two (2) separate PUCCHs.

Figure 4:
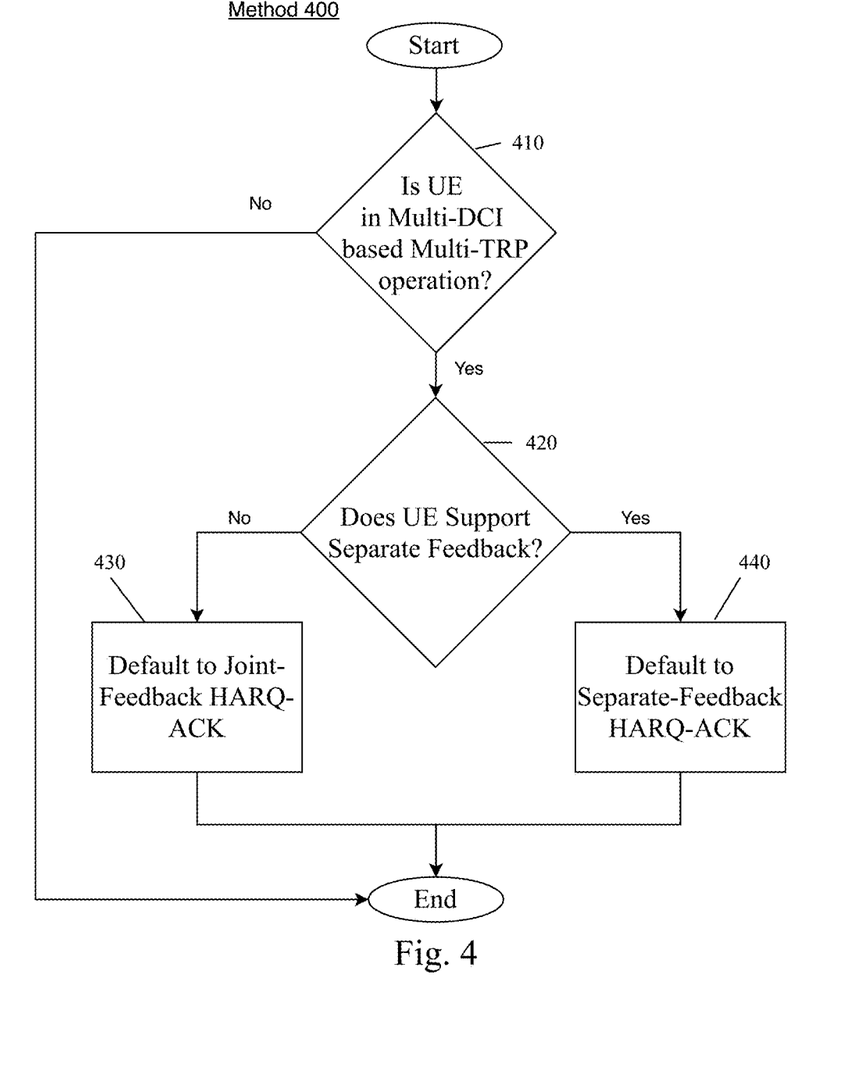
FIG. 4 shows an exemplary method of selecting a default Hybrid Automatic Repeat Request Acknowledgement (HARQ-ACK) feedback mode when the UE is in multi-DCI based multi-TRP operation according to various exemplary embodiments.

FIG. 4 shows an exemplary method 400 of selecting a default HARQ-ACK feedback mode when the UE 110 is in multi-DCI based multi-TRP operation according to various exemplary embodiments. In 410, the UE 110 determines whether the UE 110 is in multi-DCI based multi-TRP operation. The multi-DCI based multi-TRP operation is characterized by at least one CORESET being configured without a CORESETPoolIndex or with one CORESETPoolIndex=0 and at least another CORESET being configured with CORESETPoolIndex=1. If the UE 110 is not in multi-DCI based multi-TRP operation, the method 400 ends.

If the UE 110 is in multi-DCI based multi-TRP operation, the method 400 proceeds to 420 where the UE 110 determines if it supports the separate feedback HARQ-ACK mode. If the UE 110 supports the separate feedback HARQ-ACK mode, the method 400 proceeds to 440 where the default HARQ feedback mode may be set to "separate feedback." If it is determined in 420 that the UE 110 does not support the separate feedback HARQ-ACK mode but the UE supports joint HARQ-ACK mode, the method proceeds to 430 where the default HARQ-ACK feedback mode may be set to "joint feedback." Thus, at the end of method 400, the default HARQ-ACK feedback mode is set for the UE 110.

Figure 5:
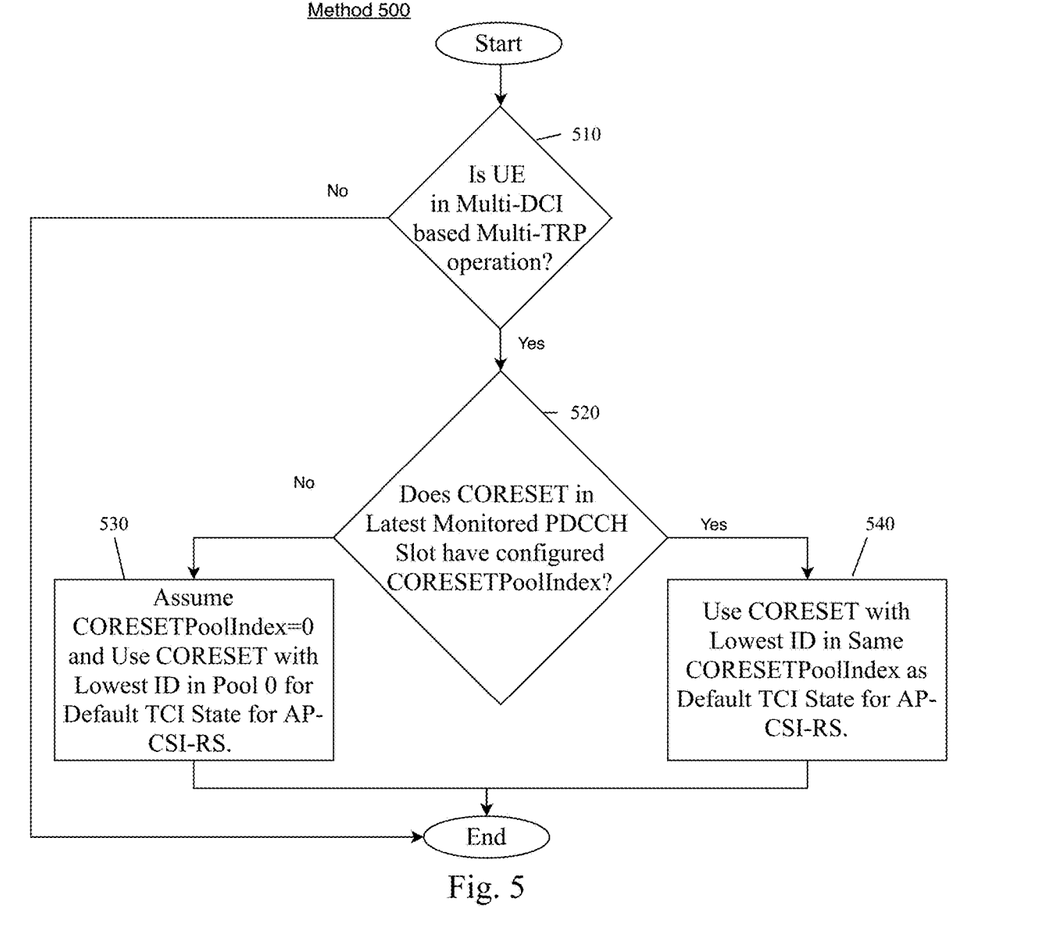
FIG. 5 shows an exemplary method of selecting a default Transmission Configuration Indication (TCI) state for Aperiodic Channel State Indication-Reference Signals (AP-CSI-RS) when the UE is in multi-DCI based multi-TRP operation according to various exemplary embodiments.

As described above, a fourth issue to be resolved for a UE in multi-DCI based multi-TRP operation is a default Transmission Configuration Indication (TCI) state for Aperiodic Channel State Indication-Reference Signals (AP-CSI-RS). FIG. 5 shows an exemplary method 500 of selecting a default TCI state for AP-CSI-RS when the UE 110 is in multi-DCI based multi-TRP operation according to various exemplary embodiments. In 510, the UE 110 determines whether the UE 110 is in multi-DCI based multi-TRP operation. The operation 510 is the same as the operation 410 described above. If the UE 110 is not in multi-DCI based multi-TRP operation, the method 500 ends.

If the UE 110 is in multi-DCI based multi-TRP operation, the method 500 proceeds to 520 where the UE 110 determines if the CORESET in the latest monitored PDCCH slot has a configured CORESETPoolIndex. If the CORESET in the latest monitored PDCCH slot has a configured CORESETPoolIndex, the method 500 proceeds to 540 where the default TCI state for AP-CSI-RS may be set to the CORESET that has the lowest CORESET-ID in the same CORESET pool as the CORESET in the latest monitored PDCCH slot. In this case, the CORESETPoolIndex is the same as the CORESET from which UE 110 decodes the DCI that triggers the AP-CS-RS. If it is determined in 520 that the CORESET in the latest monitored PDCCH slot does not have a configured CORESETPoolIndex, the method proceeds to 530 where the default TCI state for AP-CSI-RS may be set to the CORESET that has the lowest CORESET-ID in the CORESETPoolIndex{0}. Thus, at the end of method 500, the default TCI state for AP-CSI-RS is set for the UE 110.

Figure 6:
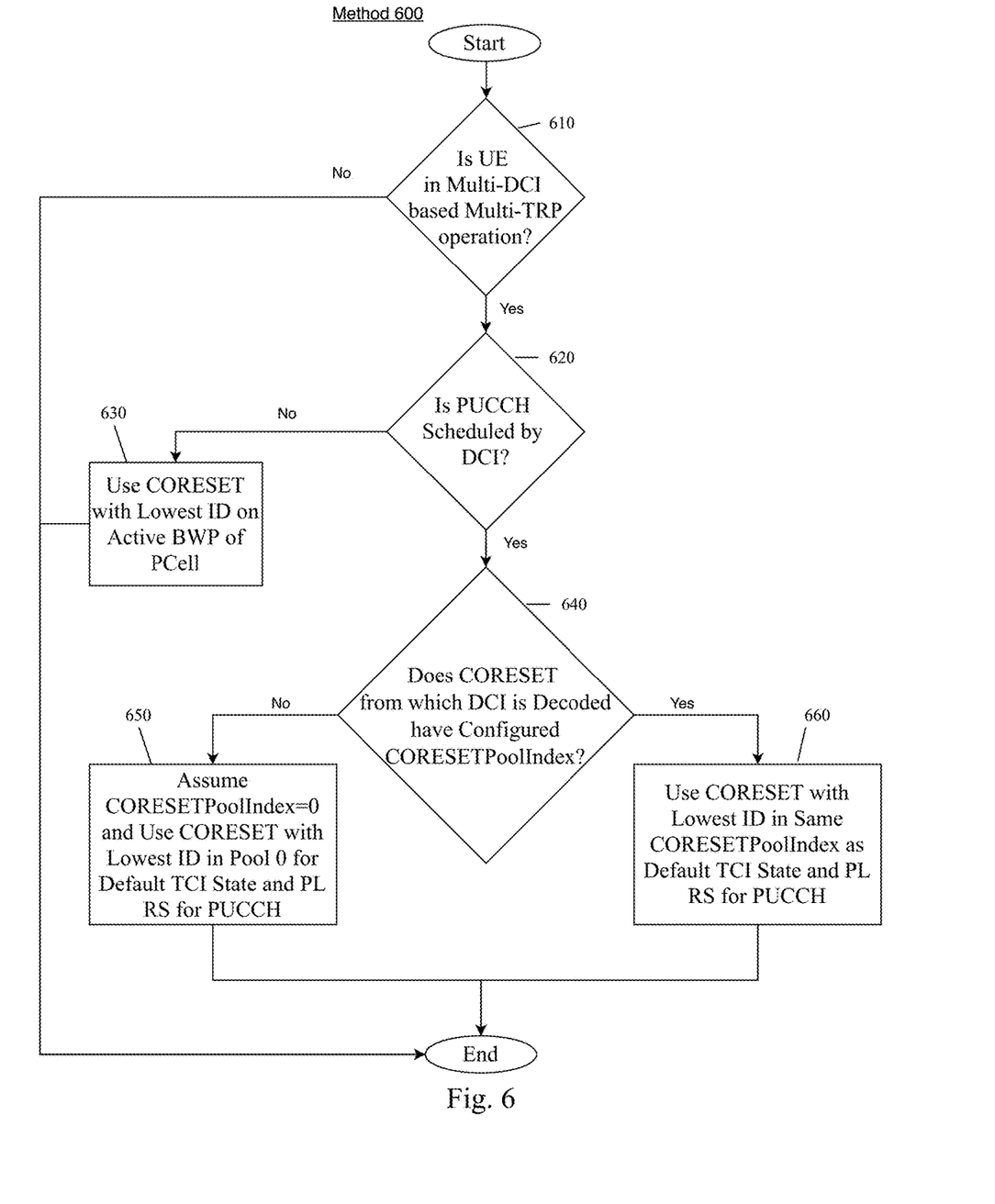
FIG. 6 shows an exemplary method of selecting a default Physical Uplink Control Channel (PUCCH) beam and pathloss reference signal (RS) according to various exemplary embodiments.

As described above, a fifth issue to be resolved for a UE in multi-DCI based multi-TRP operation is a default Physical Uplink Control Channel (PUCCH) beam and pathloss RS. FIG. 6 shows an exemplary method 600 of selecting a default PUCCH beam and pathloss RS according to various exemplary embodiments. In 610, the UE 110 determines whether the UE 110 is in multi-DCI based multi-TRP operation. The operation 610 is the same as the operation 410 described above. If the UE 110 is not in multi-DCI based multi-TRP operation, the method 600 ends.

If the UE 110 is in multi-DCI based multi-TRP operation, the method 600 proceeds to 620 where the UE 110 determines if the PUCCH has been scheduled by a DCI. If the PUCCH has not been scheduled by a DCI, the method proceeds to 630 where the default TCI state and pathloss RS for the PUCCH may be set based on a latest PDCCH reception by the UE 110 in the CORESET with the lowest ID on the active downlink (DL) bandwidth part (BWP) of the primary cell (PCell), e.g., gNB 120A.

If the PUCCH has not been scheduled by a DCI, the method proceeds to 640, where the UE 110 determines whether the CORESET in which the DCI has been decoded has a configured CORESETPoolIndex. If the CORESET in which the DCI has been decoded has a configured CORESETPoolIndex, the method 600 proceeds to 660 where the default TCI state and pathloss (PL) RS for the PUCCH may be set to the CORESET that has the lowest CORESET-ID in the same CORESET pool as the CORESET in which the DCI has been decoded. In this case, the CORESETPoolIndex is the same as the CORESET from which UE 110 decodes the DCI that triggers the PUCCH. If it is determined in 640 that the CORESET in which the DCI has been decoded does not have a configured CORESETPoolIndex, the method proceeds to 650 where the default TCI state and pathloss RS for the PUCCH may be set to the CORESET that has the lowest CORESET-ID in the CORESETPoolIndex{0}. Thus, at the end of method 600, the default TCI state and pathloss RS for the PUCCH is set for the UE 110.

As described above, a sixth issue to be resolved for a UE in multi-DCI based multi-TRP operation is to resolve a conflict between multi-DCI and single-DCI configurations. The UE 110 may be simultaneously configured for both multi-DCI based multi-TRP operation and single-DCI based multi-TRP operation. As described above, the UE 110 may be configured in multi-DCI based multi-TRP operation when at least one CORESET is configured without a CORESETPoolIndex or with a CORESETPoolIndex=0 and at least another CORESET is configured with CORESETPoolIndex=1. The UE 110 may be configured in single-DCI based multi-TRP operation when a Medium Access Control-Control Element (MAC-CE) activates at least one TCI codepoint with 2 TCI States and/or Radio Resource Control (RRC) signaling configures a RepNumR16 parameter in at least in one entry in PDSCH-TimeDomainResourceAllocation. The RepNumR16 parameter indicates to the UE 110 that it may be receiving multiple TCI states corresponding to multi-TRP operation. Thus, if the UE 110 is configured with both multi-DCI and single-DCI based multi-TRP configurations, the UE 110 may need to resolve the conflict.

There may be several manners of resolving the conflict. In a first exemplary embodiment, the UE 110 may consider that the simultaneous multi-DCI and single-DCI based multi-TRP configuration is an error case. In this exemplary embodiment, the behavior of the UE 110 may be unspecified. In a second exemplary embodiment, when the UE 110 is configured with simultaneous multi-DCI and single-DCI based multi-TRP, the UE 110 may not monitor DCI scheduling from CORESETs in CORESETPoolIndex=1, e.g., the UE 110 will only monitor DCI scheduling for the primary cell.

In a third exemplary embodiment, when the UE 110 is configured with simultaneous multi-DCI and single-DCI based multi-TRP, the UE 110 may ignore the single-DCI based multi-TRP configuration and only operate in multi-DCI based multi-TRP operation. In a fourth exemplary embodiment, when the UE 110 is configured with simultaneous multi-DCI and single-DCI based multi-TRP, the UE 110 may ignore the multi-DCI based multi-TRP configuration and only operate in single-DCI based multi-TRP operation.

Thus, the above exemplary embodiments provide various solutions to resolve issues related to a UE in multi-DCI based multi-TRP operation.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A method, comprising:
at a user equipment (UE) in multiple Downlink Control Information (multi-DCI) based multiple transmission and reception point (multi-TRP) configuration having simultaneous connections with a first next generation node B (gNB) and a second gNB over a same carrier:
receiving, from one of the first or second gNBs, one or more cell reference signal (CRS) rate matching patterns, wherein the one or more CRS rate matching patterns comprise an indication of a control resource set (CORESET) pool for each of the one or more CRS rate matching patterns;
applying the one or more CRS rate matching patterns to a CORESET for a Physical Downlink Shared Channel (PDSCH) based on the indication of the CORESET pool;
determining whether a Physical Uplink Control Channel (PUCCH) is scheduled by a DCI;
when the PUCCH is scheduled by the DCI, determining whether a CORESET from which the DCI is decoded has a configured CORESET pool;
when the CORESET from which the DCI is decoded has a configured CORESET pool, setting the default TCI state and pathloss reference signal to a CORESET having a lowest CORESET identification among CORESETs having the same CORESET pool indication as the DCI that triggers the PUCCH transmission in a latest PDCCH monitoring slot; and
when the CORESET from which the DCI is decoded does not have a configured CORESET pool, setting the default TCI state and pathloss reference signal to a CORESET in a predefined CORESET pool having a lowest CORSET identification.

2. The method of claim 1, wherein the one or more CRS rate matching patterns are grouped based on the CORESET pool to which each of the one or more CRS rate matching patterns belongs, wherein the indication is based on at least a group to which each of the one or more CRS rate matching patterns belongs.

3. The method of claim 1, wherein the one or more CRS rate matching patterns are grouped corresponding to the first gNB or the second gNB.

4. The method of claim 1, wherein the indication is one of an explicit indication or an implicit indication.

5. The method of claim 4, wherein, when the indication is the implicit indication, the method further comprises:
when a first predefined pool has less than a maximum number of CRS rate matching patterns, determining the CORESET pool to be the first predefined pool; and
when the first predefined pool has the maximum number of CRS rate matching patterns, determining the CORESET pool to be a second predefined pool.

6. The method of claim 1, wherein the UE is configured to perform a first number of blind decoding operations or a second number of channel estimation operations over non-overlapping Control Channel Elements (CCEs) for a DCI in a Physical Downlink Control Channel (PDCCH) based on a parameter, wherein a value of the parameter is one of (i) reported to one of the first or second gNBs by the UE, or (ii) a predefined value.

7. The method of claim 1, further comprising:
determining whether the UE supports a separate Hybrid Automatic Repeat Request Acknowledgement (HARQ-ACK) feedback mode, wherein each of the first and second gNBs provides a separate HARQ-ACK feedback to the UE;
when the UE supports the separate HARQ-ACK feedback mode, setting a default HARQ-ACK feedback mode to the separate HARQ-ACK feedback mode; and
when the UE does not support the separate HARQ-ACK feedback mode, setting the default HARQ-ACK feedback mode to a joint HARQ-ACK feedback mode, wherein the first and second gNBs jointly provide HARQ-ACK feedback to the UE.

8. The method of claim 1, further comprising:
determining whether a CORESET in a latest monitored PDCCH slot has a configured CORESET pool;
when the CORESET in the latest monitored PDCCH slot has the configured CORESET pool, setting a default Transmission Configuration Indication (TCI) state for Aperiodic Channel State Indication-Reference Signals (AP-CSI-RS) to a CORESET having a lowest CORSET identification among CORESETs having the same CORESET pool indication as a DCI that triggers the corresponding AP-CSI-RS; and
when the CORESET in the latest monitored PDCCH slot does not have the configured CORESET pool, setting the default TCI state for AP-CSI-RS to a CORESET in a predefined CORESET pool having a lowest CORSET identification.

9. The method of claim 1, further comprising:
when the PUCCH is not scheduled by the DCI, setting a default Transmission Configuration Indication (TCI) state and pathloss reference signal based on a CORESET having a lowest CORESET identification in an active bandwidth part of one of the first and second gNBs that is designated as a primary cell.

10. The method of claim 1, further comprising:
determining whether the UE is simultaneously in the multi-DCI based multi-TRP configuration and a single-DCI based multi-TRP) configuration; and
one of (i) placing the UE in an error condition, (ii) omitting monitoring a DCI corresponding to a predefined CORESET pool, (iii) ignoring the single-DCI configuration and operating in the multi-DCI based multi-TRP operation or (iv) ignoring the multi-DCI configuration and operating in single-DCI based multi-TRP operation.

11. A user equipment (UE), comprising:
a transceiver configured to connect to a first next generation node B (gNB) and a second gNB over a same carrier in a multiple Downlink Control Information (multi-DCI) based multiple transmission and reception point (multi-TRP) configuration; and
a processor configured to:
receive, from one of the first or second gNBs, one or more cell reference signal (CRS) rate matching patterns, wherein the one or more CRS rate matching patterns comprise an indication of a control resource set (CORESET) pool for each of the one or more CRS rate matching patterns,
apply the one or more CRS rate matching patterns to a CORESET for a Physical Downlink Shared Channel (PDSCH) based on the indication of the CORESET pool,
determine whether a Physical Uplink Control Channel (PUCCH) is scheduled by a DCI,
when the PUCCH is scheduled by the DCI, determine whether a CORESET from which the DCI is decoded has a configured CORESET pool,
when the CORESET from which the DCI is decoded has a configured CORESET pool, set the default TCI state and pathloss reference signal to a CORESET having a lowest CORESET identification among CORESETs having the same CORESET pool indication as the DCI that triggers the PUCCH transmission in a latest PDCCH monitoring slot, and
when the CORESET from which the DCI is decoded does not have a configured CORESET pool, set the default TCI state and pathloss reference signal to a CORESET in a predefined CORESET pool having a lowest CORSET identification.

12. The UE of claim 11, wherein the one or more CRS rate matching patterns are one of (i) grouped based on the CORESET pool to which each of the one or more CRS rate matching patterns belongs, wherein the indication is based on at least a group to which each of the one or more CRS rate matching patterns belongs, or (ii) grouped corresponding to the first gNB or the second gNB.

13. The UE of claim 11, wherein the indication is one of an explicit indication or an implicit indication, and wherein when the indication is the implicit indication, the UE is further configured to:
determine the CORESET pool to be a first predefined pool when the first predefined pool has less than a maximum number of CRS rate matching patterns, and
determine the CORESET pool to be a second predefined pool when the first predefined pool has the maximum number of CRS rate matching patterns.

14. The UE of claim 11, wherein the UE is configured to perform a number of blind decoding operations for a DCI in a Physical Downlink Control Channel (PDCCH) based on a parameter, wherein a value of the parameter is one of (i) reported to one of the first or second gNBs by the UE, or (ii) a predefined value.

15. The UE of claim 11, wherein the processor is further configured to:
determine whether the UE supports a separate Hybrid Automatic Repeat Request Acknowledgement (HARQ-ACK) feedback mode, wherein each of the first and second gNBs provides a separate HARQ-ACK feedback to the UE,
when the UE supports the separate HARQ-ACK feedback mode, set a default HARQ-ACK feedback mode to the separate HARQ-ACK feedback mode; and
when the UE does not support the separate HARQ-ACK feedback mode, set the default HARQ-ACK feedback mode to a joint HARQ-ACK feedback mode, wherein the first and second gNBs jointly provide HARQ-ACK feedback to the UE.

16. The UE of claim 11, wherein the processor is further configured to:
determine whether a CORESET in a latest monitored PDCCH slot has a configured CORESET pool;
when the CORESET in the latest monitored PDCCH slot has the configured CORESET pool, set a default Transmission Configuration Indication (TCI) state for Aperiodic Channel State Indication-Reference Signals (AP-CSI-RS) to a CORESET having a lowest CORSET identification among CORESETs having the same CORESET pool indication as a DCI that triggers the corresponding AP-CSI-RS; and
when the CORESET in the latest monitored PDCCH slot does not have the configured CORESET pool, set the default TCI state for AP-CSI-RS to a CORESET in a predefined CORESET pool having a lowest CORSET identification.

17. The UE of claim 11, wherein the processor is further configured to:
determine whether the UE is simultaneously in the multi-DCI based multi-TRP configuration and a single-DCI based multi-TRP) configuration; and
one of (i) place the UE in an error condition, (ii) omit monitoring a DCI corresponding to a predefined CORESET pool, (iii) ignore the single-DCI configuration and operating in the multi-DCI based multi-TRP operation or (iv) ignore the multi-DCI configuration and operating in single-DCI based multi-TRP operation.

18. An integrated circuit configured for use in a user equipment (UE) in multiple Downlink Control Information (multi-DCI) based multiple transmission and reception point (multi-TRP) configuration having simultaneous connections with a first next generation node B (gNB) and a second gNB over a same carrier, comprising:
circuitry configured to receive, from one of the first or second gNBs, one or more cell reference signal (CRS) rate matching patterns, wherein the one or more CRS rate matching patterns comprise an indication of a control resource set (CORESET) pool for each of the one or more CRS rate matching patterns;
circuitry configured to apply the one or more CRS rate matching patterns to a CORESET for a Physical Downlink Shared Channel (PDSCH) based on the indication of the CORESET pool;
circuitry configured to determine whether a Physical Uplink Control Channel (PUCCH) is scheduled by a DCI;
circuitry configured to determine whether a CORESET from which the DCI is decoded has a configured CORESET pool when the PUCCH is scheduled by the DCI;
circuitry configured to set the default TCI state and pathloss reference signal to a CORESET having a lowest CORESET identification among CORESETs having the same CORESET pool indication as the DCI that triggers the PUCCH transmission in a latest PDCCH monitoring slot when the CORESET from which the DCI is decoded has a configured CORESET pool; and circuitry configured to set the default TCI state and pathloss reference signal to a CORESET in a predefined CORESET pool having a lowest CORSET identification when the CORESET from which the DCI is decoded does not have a configured CORESET pool.

* * * * *